US009352680B2

(12) United States Patent
Cermak et al.

(10) Patent No.: US 9,352,680 B2
(45) Date of Patent: May 31, 2016

(54) VEHICLE REMOTE START ATTEMPTS MESSAGING SYSTEM AND METHOD

(71) Applicant: General Motors, LLC, Detroit, MI (US)

(72) Inventors: Alexander X. Cermak, Detroit, MI (US); Esteban Camacho, Belleville, MI (US); Ryan Olejniczak, Clinton Township, MI (US); Jeffrey J. Olsen, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/489,214

(22) Filed: Sep. 17, 2014

(65) Prior Publication Data

US 2016/0075272 A1    Mar. 17, 2016

(51) Int. Cl.
*B60R 25/10* (2013.01)
*B60Q 1/00* (2006.01)
*B60R 25/24* (2013.01)
*B60R 25/102* (2013.01)

(52) U.S. Cl.
CPC ............. *B60Q 1/00* (2013.01); *B60R 25/102* (2013.01); *B60R 25/24* (2013.01)

(58) Field of Classification Search
CPC .. B60R 25/102; B60R 25/2009; B60R 25/24; B60R 2325/205; B60R 2325/101; B60R 2025/1016; B60R 25/209; B60Q 1/00; G07C 9/00309; G08C 17/02; G08C 2201/93; G08C 2201/51; G08B 25/10
USPC ............... 340/426.13, 426.1, 426.15, 426.18, 340/542, 539.11, 539.13, 539.14, 539.16, 340/539.23, 539.25, 425.5, 426.35; 701/2, 701/1; 455/569.1, 569.2, 456.1; 307/10.1
See application file for complete search history.

(56) References Cited

U.S. PATENT DOCUMENTS

| | | | |
|---|---|---|---|
| 6,853,895 B2 * | 2/2005 | Javaherian | ......... F02N 11/0807 123/491 |
| 6,983,726 B1 | 1/2006 | Luo et al. | |
| 7,504,931 B2 * | 3/2009 | Nguyen | ................ B60R 25/102 340/426.15 |
| 8,112,185 B2 * | 2/2012 | Wu | ....................... B60R 25/045 123/179.12 |
| 2008/0161988 A1 | 7/2008 | Oesterling et al. | |
| 2011/0074561 A1 * | 3/2011 | Mackjust | ................ B60R 25/10 340/426.13 |

* cited by examiner

*Primary Examiner* — Anh V La
(74) *Attorney, Agent, or Firm* — Dierker & Kavanaugh, P.C.

(57) ABSTRACT

In a messaging system, computer readable instructions are executable by a processor of a communications server to: detect a vehicle remote start attempt that is initiated by a mobile communications device, transmit a remote start request to the vehicle, and receive a notification corresponding to success and/or failure of the attempt. If the attempt fails, the computer readable instructions are executable by the processor to: receive a cause of the failure encoded in a dynamic error message, decode the dynamic error message, and construct a custom failure message that is indicative of the cause of the failure. If the attempt succeeds, the computer readable instructions are executable by the processor to generate a success message based upon the notification corresponding to the success of the attempt. The computer readable instructions are also executable by the processor to transmit the success or custom failure message to the mobile communications device.

15 Claims, 2 Drawing Sheets

VEHICLE REMOTE START ATTEMPTS MESSAGING SYSTEM AND METHOD

TECHNICAL FIELD

The present disclosure relates to a messaging system and method for vehicle remote start attempts.

BACKGROUND

Vehicles are often equipped with remote starts which can be activated, for example, through a key fob, an application on a mobile communications device, or some other device capable of communicating with the vehicle through a short range wireless communication. Remotely starting the vehicle may be particularly desirable when the vehicle is located in an extremely cold or hot environment. The remote start allows the vehicle user to warm up or cool down the vehicle before he/she enters the vehicle.

SUMMARY

In an example of a messaging system for remote start attempts, a communications server includes computer instructions to be executed by a processor of the communications server. The computer readable instructions, when executed by the processor, enable the communications server to detect a remote start attempt of a vehicle that has been initiated by a mobile communications device; transmit a remote start request to the vehicle; and receive, from the vehicle, data corresponding to the success or failure of the remote start attempt. If the remote start attempt fails, the computer readable instructions enable the communications server to receive, from the vehicle, the cause of the failure encoded in a dynamic error message; decode the dynamic error message; and construct a custom failure message that is indicative of the cause of the remote start failure. If the remote start attempt succeeds, the computer readable instructions enable the communications server to generate a success message based upon the data corresponding to the success of the remote start attempt received from the vehicle. The computer readable instructions also allow the communications server to transmit either the success message or the custom failure message to the mobile communications device.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In the examples disclosed herein, a vehicle communications platform service provider responds to vehicle remote start attempts that are received from a mobile communications device (e.g., a smart phone, a tablet computer, or other device that has a vehicle-related application stored thereon). The vehicle communications platform service provider is equipped with a communications server that includes a processor to run a remote start application. The remote start application enables the communications server to perform a variety of actions that not only initiate an attempt to remotely start the vehicle, but also keep the user of the mobile communications device informed about the status of the vehicle remote start attempt. In particular, when the vehicle remote start attempt fails, the remote start application is programmed to determine a cause of the failed attempt and to generate a custom failure message that is indicative of the cause of the failed attempt. The remote start application is a back-end program that advantageously interacts with the vehicle-related application on the mobile communications device to enhance a user's experience when attempting to remotely start his/her vehicle using the mobile communications device.

It is to be understood that, as used herein, the term "user" includes a vehicle owner or another authorized driver of the vehicle, and/or a mobile communications device owner or another authorized use of the mobile communications device.

The term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Figure 1:
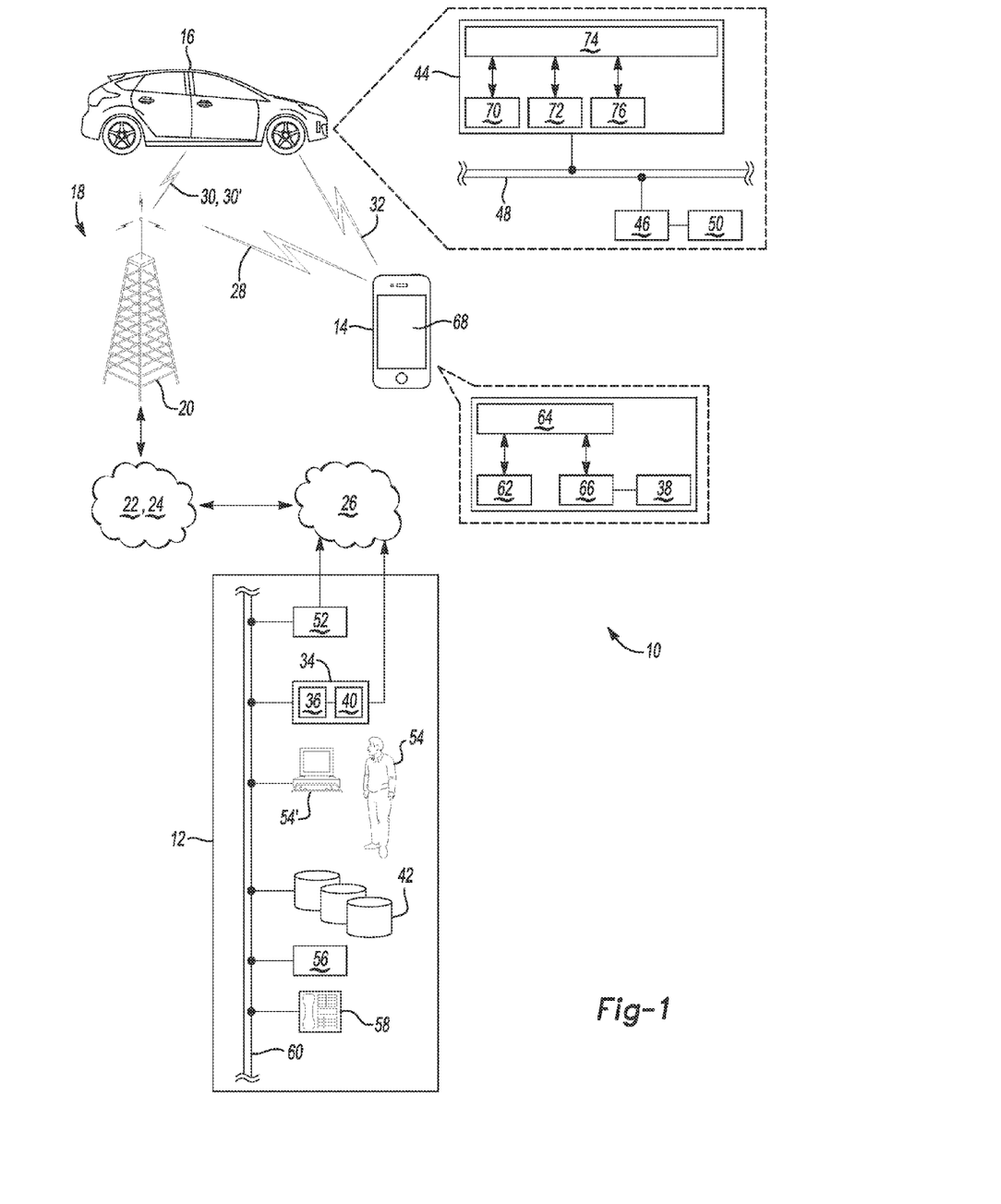
FIG. 1 is a schematic view of an example of a messaging system for remote start attempts.

Referring now to FIG. 1, the system 10 includes a vehicle communications platform (VCP) service provider 12, a mobile communications device 14 and a vehicle 16. The various components of the system 10 (e.g., 12, 14 and 16), communicate with one another over a carrier/communication system 18.

The carrier/communication system 18 may include one or more cell towers 20 or satellites (not shown). It is to be understood that the carrier/communication system 16 may also include one or more base stations and/or mobile switching centers (MSCs) 22 (e.g., for a 2G/3G network), one or more evolved Node Bs (eNodeB) and evolved packet cores (EPC) 24 (for a 4G (LTE) network), and/or one or more land networks 26. The carrier/communication system 18 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the carrier/communication system 18 may be GSM (global system for mobile telecommunications), CDMA2000, UMTS (universal mobile telecommunications system), LTE (long-term evolution), or some other available architecture.

The carrier/communication system 18 may enable cellular connections 28, 30 to be made between communication component(s) of the VCP service provider 12, the mobile communications device 14, and the vehicle 16. An Internet connection may also be utilized for the transmission of message(s) between the system components (e.g., the VCP service provider 12, the mobile communications device 14, and the vehicle 16). The transmission of these messages may be made using the carrier/communication system 18, either through the vehicle's Internet connection 30 (e.g., when the vehicle 12 is equipped with a 4G long-term evolution, LTE, or other suitable Internet connection) or through the mobile communications device's cellular and Internet connection 28. The mobile communications device 14 and the vehicle 16 may also be equipped to establish a short range wireless communication link 32. The various connections/communication links between the various components are shown as lightning bolts in FIG. 1.

The VCP service provider 12 provides the vehicle 16 with a variety of services, including, for example, remote start attempts and messaging as disclosed herein. The VCP service provider 12 includes a communications server 34. The communications server 34 may be comprised of a single server running applications/programs (including computer readable code/instructions), or may be comprised of multiple servers running applications/programs. In an example, the communications server 34 includes one server and/or set of computer readable instructions (e.g., a mobile integration gateway or MIG 36) that specifically services requests from a vehicle-related application 38, and another server (e.g., vehicle communication server or VCS 40) that specifically communicates with the vehicle 16. Whether both servers, or a set of computer readable instructions and a server, the MIG 36 and the VCS 40 together are a system of computer hardware (e.g., processor(s), etc.) and computer readable instructions (stored on a tangible, non-transitory computer readable medium) that are executable by the hardware of the system. The MIG 36 and the VCS 40 enable the communications server 34 to perform the messaging method disclosed herein.

In some instances, the MIG 36 is a gateway that facilitates the servicing of requests from the vehicle-related application 38 stored on the mobile communications device 14. For example, the MIG 36 may be a node that is equipped for interfacing with the mobile communications device 14 and its proprietary messaging service (which may be part of a different network), as well as with other components of the communications server 34. In other instances, the MIG 36 is equipped to execute computer readable instructions to service requests from the vehicle-related application 38 stored on the mobile communications device 14. For example, basic commands may be sent to the MIG 36 from the vehicle-related application 38, and then the MIG 36, together with the VCS 40, translates the commands into vehicle computer-readable commands. Throughout this description, the MIG 36 is often referred to as being capable of facilitating one or more steps of the method. It is to be understood that this term is meant to encompass either or both of the instances previously described. As will be discussed in more detail herein, the MIG 36 facilitates the detection a vehicle remote start attempt that is initiated using the mobile communications device 14, and constructs custom message(s) that is/are to be transmitted to the mobile communications device 14 to keep a user of the device 14 apprised of the status of the remote start attempt.

Messages (including remote start attempt requests, success messages, custom failure messages, etc.) between the MIG 36 and the vehicle-related application 38 (stored on the mobile communications device 14) may be transmitted through a cellular connection or through a data connection.

When the cellular connection is used, the messages may be transmitted through the proprietary messaging service of the mobile communications device 14. In this particular example, a server (not shown) of the proprietary messaging service authenticates that message(s) is/are received from a trusted source (e.g., vehicle-related application 38 or MIG 36), and then sends the message(s) on to the appropriate recipient (e.g., MIG 36 or vehicle-related application 38).

When the data connection (e.g., dedicated short-range communications (DSRC) or WI-FI™ and various classes thereof (e.g., WI-FI™ direct)) is utilized, the MIG 36 interacts directly with the mobile communications device 14. A data session ID may be generated by the vehicle-related application 38 when sending the initial remote start attempt. The data session ID enables the MIG 36 to identify which mobile communications device 14 is sending the message. The same data session ID may be used to transmit message(s) from the MIG 36 to the mobile communications device 14.

In an example, a user wanting to initiate the remote start attempt may log into his/her account with the VCP service provider 12 through the vehicle-related application 38 using his/her account credentials, including, for example, a personal identification number (PIN) or passcode. The PIN may be used by the MIG 36 (or the VCS 40) to recognize that the message is from a trusted user and to identify the account and the vehicle 16 associated with the PIN/passcode. The remote start attempt message is transmitted to the MIG 36 for processing.

The MIG 36 facilitates the detection of the vehicle remote start attempt that is initiated using the mobile communications device 14. The MIG 36 detects a vehicle remote start attempt when it receives a request from the vehicle-related application 38, e.g., over a data connection. The MIG 36 is programmed to identify the vehicle-related application 38 or the mobile communications device 14 from which the remote start attempt request was sent through the PIN/passcode that is entered, and through the data session ID that is transmitted in a header of the request. The MIG 36 can use the PIN/passcode to locate and access the user's vehicle-related account (in the database 42). The MIG 36 also uses the data session ID when transmitting messages back to the vehicle-related application 38/mobile communications device 14.

The MIG 36 may also transmit a message back to vehicle-related application 38/mobile communications device 14, in response to receiving the remote start attempt request and identifying the vehicle-related application 38 or the mobile communications device 14. This message may be a pop-up or push notification that informs the user of the mobile communications device 14 that the remote start attempt request is being processed.

In an example, the time that lapses between the transmission of the remote start attempt request from the mobile communications device 14 and the user receiving a notification (at the mobile communications device 14) that the vehicle remote start attempt is being processed may range from about 2 seconds to about 7 seconds. In an example, the time that lapses may be about 3 seconds.

Also in response to receiving the remote start attempt request, the MIG 36 facilitates the transmission of the request to the VCS 40. The VCS 40 is programmed to identify the vehicle 16 that is to be remotely started. For one example, the VCS 40 may match the remote start attempt request with the account and the vehicle 16 through the PIN/passcode that is transmitted in the header of the request. For another example, the VCS 40 may retrieve a vehicle identifier (e.g., a vehicle identification number (VIN)) that is transmitted in the header of the request. The vehicle-related application 38 knows which vehicle identifier to include because the user registers his/her vehicle(s) 16 with a remote start option/service of the vehicle-related application 38. When a single vehicle 16 is registered with the remote start option, the application 38 may select the registered vehicle identifier to include in the request. When multiple vehicles 16 are registered, the application 38 may select which vehicle identifier to include in the request in response to the user selecting the vehicle 16 that is to be started.

Upon identifying the vehicle 16 that is to be remotely started, the VCS 40 starts a packet session with the vehicle 16. To start the packet session, the VCS 40 transmits a packet session request to the vehicle communications platform (VCP) 44 (which is an on-board vehicle dedicated communications device). When the vehicle 16 is turned off, the VCP 44 remains in a low power state, and thus can receive a packet session request from the VCS 40. Upon receiving the packet session request, the VCP 44 enters its normal operating state, and transmits signals to other vehicle sub-system modules 46 commanding them to enter their normal operating states. In response, the sub-system modules 46 (including the body control module (BCM), powertrain control module (i.e., engine control unit and transmission control unit), etc.) enter their normal operating states. It is to be understood that when the VCP 44 and the sub-system modules 46 enter their normal operating states, the vehicle 16 is not yet started, but rather the sub-system module(s) 46 that are capable of starting the vehicle 16 are operable.

When the VCP 44 and the sub-system modules 46 enter their normal operating states, the VCP 44 can transmit a message back to the VCS 40 indicating that the packet session has been established. Setting up the packet session between the VCS 40 and the VCP 44 may take from about 5 seconds to about 10 seconds.

When the packet session is established, the VCS 40 generates and sends a remote start request to the vehicle 16. More particularly, the remote start request is sent to the VCP 44 (through a vehicle bus 48). The VCP 44 may send a signal that triggers the BCM (or other appropriate module) to turn the vehicle on (e.g., start ignition, power up, etc.).

After sending the remote start request, the VCS 40 may wait a preset amount of time. The preset amount of time may be up to 30 seconds, which is sufficient to account for events that may delay a remote start, such as a long crank (e.g., due to weather conditions, vehicle conditions, etc.). In an example, the preset amount of time is about 10 seconds.

In an example, the VCS 40 waits the preset amount of time without polling the VCP 44 for a response. In this example, the VCS 40 waits to receive an automatic response from the VCP 44. The automatic response from the VCP 44 may include a notification corresponding to the success of the remote start attempt (i.e., success notification) or a notification corresponding to the failure of the remote start attempt (i.e., failure notification). If the vehicle 16 is started prior to or at the end of the preset amount of time, the VCP 44 may transmit the success notification to the VCS 40 prior to or at the end of the preset amount of time. If the vehicle 16 is not successfully started by the end of the preset amount of time, the VCP 44 may recognize the preset amount of time has expired and may transmit the failure notification to the VCS 40. Alternatively, it is to be understood that the failure notification may be the lack of response from the VCP 44. If no response is received by the end of the preset amount of time, the VCS 40 may assume the vehicle 16 has not been successfully started.

In another example, the VCS 40 waits a short amount of time (e.g., up to 5 seconds), and then begins polling the VCP 44 for an updated vehicle status. The VCS 40 may poll the VCP 44 at preset intervals throughout the preset amount of time. In this example, the VCS 40 does not receive an automatic response (or push notification) from the VCP 44, but rather polls the VCP 44 for an updated vehicle status or the notification. If the VCS 40 polls the VCP 44, and the vehicle 16 has been started (e.g., a relay is active (i.e., engine is running and ignition state is off)), the VCS 40 will receive the success notification. If the VCS 40 polls the VCP 44, and the vehicle 16 has not yet been started but the preset amount of time has not lapsed, the VCS 40 will receive a notification that the remote start attempt is still in progress. If the VCS 40 polls the VCP 44, and the vehicle 16 has not yet been started and the preset amount of time has lapsed, the VCS 40 will receive a failure notification.

When the success notification is received by the VCS 40, the VCS 40 transmits a message to the MIG 36 indicating that the vehicle 16 has successfully been started. The MIG 36 generates a success message to be sent to the mobile communications device 14. This message may be a pop-up or push notification that informs the user of the mobile communications device 14 that the vehicle 16 has been started.

When the failure notification is received by the VCS 40, the VCS 40 transmits a request/inquiry to the VCP 44 asking for the cause of the remote start attempt failure. The VCP 44 receives the request for the cause of the failure, and accesses vehicle data points to determine the cause of the failure. The actions of the VCP 44 in determining the cause of the failure will be described in further detail below. Once the VCP 44 determines the cause of the remote start attempt failure (which is indicative of the BCM response to the remote start request), the VCP 44 encodes the failure cause into a dynamic error message (e.g., hexadecimal code broken out to a bit string including binary code), and transmits the dynamic error message back to the VCS 40.

Upon receiving the dynamic error message, the VCS 40 passes the dynamic error message on to the MIG 36, which decodes the dynamic error message. The dynamic error message includes the bit string, and decoding the dynamic error message initially reveals the cause of the failure in the form of numerical signals. Each bit in the bit string is predefined with a particular failure cause. For example, the bit string may include 17 bits, where bit 1 in the string is indicative of the key fob being present in the vehicle 16, bit 2 is indicative of the hood being ajar, etc. The bit number and its predefined failure cause may be stored in a look up table in the database 42 that is accessible by the MIG 36.

The predefined failure causes may include any event that prevents the vehicle 16 from starting in response to a remote start attempt. These events can be sensed by the vehicle electronics (e.g., sensors 50) and received by the VCP 44 (through modules 46 and the vehicle bus 48). Examples of failure causes include a key fob event, a hazard event, a hood ajar event, a maximum crank time event, a key in ignition event, a voltage out of range event, no remaining starts available event, no remaining start attempts available event, vehicle engine stalled event, vehicle valet mode active event, remote vehicle start disabled event, and combinations thereof.

A key fob event is when the key fob is detected in the vehicle 16 at the time of the remote start attempt. A hazard event is when the hazard lights of the vehicle 16 are active at the time of the remote start attempt. A hood ajar event is when the hood of the vehicle 16 is ajar at the time of the remote start attempt. A maximum crank time event is when the maximum crank time for the vehicle 16 has been reached and the vehicle 16 has still has not been started. A key in ignition event is when the key is detected in the starter at the time of the remote start attempt. A voltage out of range event is when the battery is too low to start the vehicle 16. A no remaining starts available event refers to a limitation set by the vehicle 16, where only two (or some other preset number) successful remote starts are available per ignition cycle. This may occur when a user has transmitted two remote start attempts within a single ignition cycle and has successfully remotely started the vehicle, and has also submitted a third remote start attempt within the same ignition cycle. Similarly, a no remaining start attempts available event is also a limitation set by the vehicle 16, where only three (or some other preset number) remote start attempts are available per ignition cycle. A vehicle engine stalled event is when the vehicle engine stalls at the time of the remote start attempt. A vehicle valet mode active event is when the valet mode of the vehicle is on at the time of the remote start attempt. A remote vehicle start disabled event is when the vehicle's remote start capability has been disabled (e.g., if a user has disabled the remote start feature using in-vehicle options).

Referring back to the dynamic error message, the numerical signals of the bit string are a binary code. In the binary code, a 0 indicates that a particular failure cause (i.e., the cause that is predefined as being associated with that bit) is not applicable and a 1 indicates that a particular failure cause (i.e., the cause associated with that bit) is applicable.

The MIG 36 analyzes the bit string for flagged numerical signal(s). A flagged numerical signal is any bit that has a 1 as its numerical signal. The MIG 36 determines which of the bit(s) is/are flagged numerical signal(s). For example, if the third bit in the 17 bit bit string (e.g., 00100000000000000) is a 1 and the rest of the bits are 0s, the MIG 36 will identify the third bit (bit 3) as the flagged numerical signal. In this example, the MIG 36 then uses a look up table (stored in the database 42) to identify the cause that is associated with bit 3. For example, if bit 3 (the flagged numerical signal) is predefined in the look up table with the hazard event, the MIG 36 determined that the failure cause is that the vehicle's hazard lights are active. It is to be understood that if there are multiple flagged numerical signals in a single bit string, the MIG 36 identifies all of the failure causes associated with the multiple flagged numerical signals. As such, the failure cause is identified from parsing the binary data.

The MIG 36 then translates the flagged numerical signal(s) and associated failure cause(s) into user-friendly alphanumeric text. In other words, the MIG 36 includes or runs computer readable instructions that can translate the binary code into a custom failure message. The custom failure message may be a pop-up or push notification that informs the mobile communications device user that the remote start attempt failed, and also provides some indication as to why the remote start attempt has failed. In some examples, the alphanumeric text may communicate the actual cause of the failure so that the vehicle user can at least attempt to rectify the problem. In other examples, the user may be sent a custom failure message that does not communicate the actual cause, but rather provides the user with a number to call for more information, or instructions for initiating another remote start attempt, or instructions for signing up/renewing a subscription for mobile device remote start attempts, etc.

The verbiage or content of the custom failure message will depend upon the flagged numerical signal(s) and the associated failure cause(s). The MIG 36 may generate a custom message or retrieve a custom message previously associated with a particular failure cause from the database 42. In an example, if bit 2 is the only bit in the bit string that is set to a numerical signal of 1, and this bit is assigned to the hazard event, the MIG 36 may generate or select verbiage for the custom message that identifies the hazard event for the user. For example, the custom message may say "Remote start failed. The vehicle cannot be started with the hazard lights active. Please disable the hazard lights and try again." In another example, if bit 12 is the only bit in the bit string that is set to a numerical signal of 1, and this bit is assigned to the no remaining starts available event, the MIG 36 may generate or select verbiage for the user to contact an advisor 54 for assistance. For example, the custom message may say "Remote start failed. Please contact 1-800-555-5555 for further instructions." When the user calls, an advisor 54 can then explain to the user that he/she can attempt the remote start again in a subsequent ignition cycle.

The MIG 36 then sends the custom failure message to the mobile communications device 14 (e.g., through the data connection).

As shown in FIG. 1, in addition to the communication server 34 (including MIG 36 and VCS 40), the VCP service provider 12 may also include switch(es) 52, advisors 54, 54', database(s) 42, processor(s) 56, and other telecommunication and computer equipment 58. The various operations of the VCP service provider 12 may be carried out by one or more computers (e.g., computer equipment 68) programmed to carry out such tasks. The telecommunication and computer equipment 58 (including computers) may include a network of servers (including server 34) coupled to both locally stored and remote databases (e.g., database 42) of any information processed.

As briefly mentioned above, the database(s) 42 may be designed to store vehicle record(s), subscriber/user profile or account records, or any other pertinent subscriber and/or vehicle information and/or mobile communications device information. The database(s) 42 may also be designed to store the look up table used to identify failure causes. It is to be understood that the databases 42 may allow the VCP service provider 12 to function as a repository for data collected from the vehicle 12, data collected from the vehicle owner/driver, and data that may be useful for the vehicle owner/driver.

The switch 52 may be a private branch exchange (PBX) switch. The switch routes incoming signals so that voice transmissions are usually sent to either a live advisor 54 or an automated response system 54', and data transmissions are passed on to a modem or other piece of equipment for demodulation and further signal processing. The modem preferably includes an encoder, and can be connected to various devices such as the server 34 and database 42.

As illustrated in FIG. 1, the various service provider components are coupled to one another via a network connection or bus 60. The bus 60 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The bus 60 enables the VCP service provider 12 to send signals (e.g., real-time bus messages, message(s)) from the MIG 36) to various units of equipment and systems both outside the VCP service provider 12 and within VCP service provider 12. The bus 60 also enables the VCP service provider 12 to receive signals from various units of equipment and systems both outside the VCP service provider 12 and within the VCP service provider 12.

It is to be appreciated that the VCP service provider 12 may be any central or remote facility, manned or unmanned, mobile or fixed, to or from which it is desirable to exchange voice and data communications. As such, the live advisor 54 may be physically present at the VCP service provider 12 or may be located remote from the VCP service provider 12 while communicating therethrough.

The VCP service provider 12 shown in FIG. 1 may also be virtualized and configured in a Cloud Computer, that is, in an Internet-based computing environment. For example, the computer equipment 58 may be accessed as a Cloud platform service, or PaaS (Platform as a Service), utilizing Cloud infrastructure rather than hosting computer equipment 58 at VCP service provider 12. The database 42 and server 34 may also be virtualized as a Cloud resource. The Cloud infrastructure, known as IaaS (Infrastructure as a Service), typically utilizes a platform virtualization environment as a service, which may include components such as the processor 56, database 42, server 34 and computer equipment 58. In an example, the remote start messaging service disclosed herein may be performed, at least partially, in the Cloud via the SaaS (Software as a Service). For example, remote start attempt requests from the mobile communications device 14 may be acted upon, and message(s) may be transmitted by the server 34 (e.g., with/through MIG 36 and VCS 40), which may be configured as a service present in the Cloud.

The system 10 disclosed herein also includes the mobile communications device 14. In an example, the mobile communications device 14 may be a smart phone, such as a GSM/LTE phone or a GSM/CDMA/LTE phone. In other examples, the mobile communications device 14 may be any portable device that has at least a cellular chipset/component 62 (e.g., for making a cellular and/or Internet connection). Examples of other mobile communications devices 14 include a tablet computer or a wearable device.

The mobile communications device 14 includes physical hardware (e.g., a micro-processor 64) and computer readable instructions stored in a memory 66. The micro-processor 64 of the mobile communications device 14 is capable of executing the computer readable instructions stored in the memory 66. At least some of the computer readable instructions include the device's operating system.

The operating system of the mobile communications device 14 is capable of receiving the success and custom failure message(s) from the MIG 36. From the alphanumeric string included in the payload/header of the message, the operating system can identify the application 38 on the device 14 that is to receive the message. If the application is not then-currently running, the operating system can wake up the application to receive and unpack the message.

As shown in FIG. 1, the mobile communications device 14 has the vehicle-related application 38 (e.g., RemoteLink™ by OnStar) resident on its memory 66. The vehicle-related application 38 may be downloaded (e.g., from an online application store or marketplace) and stored on the electronic memory 66. When the vehicle-related application 38 is installed on the user's mobile device 14, the user is presented with option to turn on a proprietary messaging service (e.g., Apple's Push Notification (PN) service or Google's Cloud Messaging (GCM) service).

In the examples disclosed herein, the vehicle-related application 38 enables the mobile communications device user to manage remote start attempts from the mobile communications device 14. In particular, the vehicle-related application 38 enables the user to sign up for a remote start service and to register one or more specific vehicles 16 with the remote start service. This information may be stored in the memory 66 and accessible by the vehicle-related application 38. This information may also be transmitted from the application 38 to the MIG 36 for storage in the user's account in the database 42.

The vehicle-related application 38 also allows the user to initiate a remote start attempt from the mobile communications device 14. Upon receiving a user input indicating that the user would like to initiate a remote start, the application 38 generates a remote start attempt message to send to the MIG 36. In some examples, the application 38 is programmed to know which vehicle identifier to include with the remote start attempt message because the user has registered his/her vehicle(s) 16 with remote start service. When a single vehicle 16 is registered with the remote start option/service, the application 38 may automatically select the vehicle identifier of the registered vehicle 16 from the memory 66 to include in the remote start attempt message. When multiple vehicles 16 are registered with the remote start option/service, the application 38 may be programmed to prompt the user to select one of the registered vehicles 16. In response to a user input, the application 38 selects the appropriate vehicle identifier from the memory 66 to include in the remote start attempt message. In other examples, the application 38 will simply include the PIN/passcode of the user, and the MIG 36 and/or VCS 40 will use that information to identify the vehicle 16 that is to be remotely started.

When generating the remote start attempt message, the application 38 is also programmed to include the data session ID in the header so that the MIG 36 is able to identify the mobile communications device 14 transmitting the message. Once the application 38 generates the remote start attempt message, it transmits the message to the MIG 36.

In the examples disclosed herein, the vehicle-related application 38 also handles displaying content received in the message(s) from the MIG 36. When a message is received by the vehicle-related application 38, the vehicle-related application 38 processes any instructions in the message, and displays the message content on the display 68 of the mobile communications device 14. The vehicle-related application 38 may also initiate some other device 14 action based on the payload of the message. For example, if the instructions in the custom failure message contain a phone number to obtain additional information about the remote start failure, the vehicle-related application 38 would launch the mobile communication device's phone dialer application with the phone number prepopulated from the custom failure message.

While not shown, the mobile communications device 14 may also be configured for short range wireless communication technologies, such as BLUETOOTH® and various classes thereof, dedicated short-range communications (DSRC), or WI-FI™ and various classes thereof (e.g., WI-FI™ direct). In an example, the mobile communications device 14 can pair with the VCP 44 of the vehicle 16 (e.g., over short range wireless communication link 32).

The system 10 disclosed herein also includes the vehicle 16. The vehicle 16 may be a car, motorcycle, truck, or recreational vehicle (RV) that is equipped with suitable hardware and computer readable instructions/code that enable it to communicate (e.g., transmit and/or receive voice and data communications) over the carrier/communication system 18 and/or using a short range wireless communication link 32.

As shown in FIG. 1, the vehicle 16 includes the vehicle communications platform (VCP) 44. As mentioned above, the VCP 44 is an on-board vehicle dedicated communications device (e.g., a telematics unit). The VCP 44 may include an integrated on-board vehicle dedicated entertainment device or may be in operative communication with a separate on-board vehicle dedicated entertainment device. Whether integrated into a single unit or included as separate units, the on-board vehicle dedicated communications and entertainment device(s) include hardware components that are capable of running computer readable instructions/code, which are embodied on non-transitory, tangible computer readable media.

The VCP 44 may be used for vehicle communications. In some instances, vehicle communications are enabled through the VCP 44 via a communications module, which includes a cellular chipset/component 70 for voice communications and a data transmission system 72 for data (e.g., rich message or data package) transmission. The data transmission system 72 may include any hardware component(s) and software that equip the vehicle 16 with an Internet connection, such as a 4G LTE connection. In another example, the data transmission system 72 may include a wireless modem, which applies some type of encoding or modulation to convert the digital data so that it can communicate through a vocoder or speech codec incorporated in the cellular chipset/component 70. It is to be understood that any suitable encoding or modulation technique that provides an acceptable data rate and bit error may be used with the examples disclosed herein. While examples have been provided, it is to be understood that any suitable data transmission system 72 may be used.

The cellular chipset/component 70 of the VCP 44 may be an analog, digital, dual-mode, dual-band, multi-mode and/or multi-band wireless transceiver. The cellular chipset-component 70 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

The VCP 44 may also be configured for short range wireless communication technologies, such as BLUETOOTH® and various classes thereof, dedicated short-range communications (DSRC), or WI-FI™ and various classes thereof (e.g., WI-FI™ direct).

The VCP 44 generally includes an electronic processing device 74 operatively coupled to one or more types of electronic memory 76. In an example, the electronic processing device 74 is a micro-processor. In other examples, the electronic processing device 74 may be a micro controller, a controller, a host processor, and/or a vehicle communications processor. In another example, electronic processing device 74 may be an application specific integrated circuit (ASIC). Alternatively, electronic processing device 74 may be a processor working in conjunction with a central processing unit (CPU) performing the function of a general-purpose processor. The electronic memory 76 of the VCP 44 may be an encrypted memory that is configured to store i) computer readable instructions/code to be executed by the processor 74, ii) data associated with the various systems of the vehicle 16 (i.e., vehicle data), iii) vehicle operations, iv) vehicle user preferences and/or personal information, and the like.

The VCP 44 is also operatively connected to a vehicle bus system 48. The vehicle bus system 48 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 48 enables the vehicle 16 to send signals (e.g., success message, encoded dynamic error messages, etc.) from the VCP 44 to various units of equipment and systems both outside the vehicle 16 and within the vehicle 16. The vehicle bus system also enables the vehicle 12 to receive signals at the VCP 32 from various units of equipment and systems both outside the vehicle 12 and within the vehicle 12 (e.g., from sensors 38).

The VCP 44 is capable of responding to commands and messages (e.g., packet session requests, remote start requests, polls for vehicle status updates, etc.) received from the VCS 40.

When the vehicle 16 is off, the VCP 44 is in a low power state. Upon receiving the packet session request from the VCS 40, the VCP 44 enters its normal operating state, and transmits signals to other vehicle sub-system modules 46 commanding them to enter their normal operating states. In response, the sub-system modules 46 (including the body control module (BCM), powertrain control module (i.e., engine control unit and transmission control unit), etc.) enter their normal operating states. When the VCP 44 and the sub-system modules 46 enter their normal operating states, the VCP 44 can transmit a message back to the VCS 40 indicating that the packet session has been established The VCP 44 also receives the remote start request from the VCS 40. In response, the VCP 44 may send a signal that triggers the BCM or other suitable module to turn the vehicle on (e.g., start ignition, power up, etc.). The VCP 44 then waits for a signal from the powertrain control module indicating that the vehicle 16 has been successfully started, or has failed to start.

In one example, the VCP 44 may be programmed to wait the preset amount of time, and then transmit a notification of remote start success or failure to the VCS 40. In another example, the VCP 44 may be programmed to respond to polls from the VCS 40. Upon receiving a poll from the VCS 40, the VCP 44 checks if the vehicle 16 has been started, and if not, if the preset amount of time has expired. If the VCS 40 polls the VCP 44, and the vehicle 16 has been started (e.g., a relay is active (i.e., engine started and ignition off), the VCP 44 will transmit the success notification. If the VCS 40 polls the VCP 44, and the vehicle 16 has not yet been started but the preset amount of time has not lapsed, the VCP 44 will transmit the notification that the remote start attempt is still in progress. If the VCS 40 polls the VCP 44, and the vehicle 16 has not yet been started and the preset amount of time has lapsed, the VCP 44 will transmit the failure notification.

The VCP 44 also receives the request/inquiry for the cause of the remote start attempt failure. Upon receiving this request, the VCP 44 is programmed to access vehicle data points from various modules 46 and sensors 50. The VCP 44 may collect any data point that is indicative of the remote start failure.

The VCP 44 then generates the dynamic error message. The dynamic error message is an encoded message with several bytes as pass-through data from the BCM response to the remote start request. The VCP 44 includes a packet builder, which is programmed to make decisions about what packet to send (e.g., bandwidth, data to include, etc.), and to actually build the dynamic error message that is responsive to the request/inquiry for the cause of the remote start attempt failure. The packet builder assigns the binary code (1s and 0s) to the various data points, which are indicative of the BCM response, so that the resulting bit string has an appropriate numerical signal assigned to an appropriate bit. For example, if the signal from the BCM for the presence of the key fob in the vehicle 16 is negative or is not received by the VCP 44, the VCP 44 will assign the bit associated with the key fob event a 0, because this particular event is not the failure cause for this remote start failure. Once the binary code is assigned to each bit, the VCP 44 has generated the dynamic error message.

The VCP 44 then transmits the dynamic error message to the VCS 40 for further processing and generation of the custom failure message.

While not shown in FIG. 1, the VCP 44 may also include other components, such as a location detection chipset/component, which may include a GPS receiver, a radio triangulation system, a dead reckoning position system, and/or combinations thereof. In particular, a GPS receiver provides accurate time and latitude and longitude coordinates of the vehicle 16 responsive to a GPS broadcast signal received from a GPS satellite constellation (not shown). The location detection chipset/component 34 may also include, for example, Glonass (i.e., global navigation satellite system), Sbas (i.e., satellite-based augmentation systems), or a D-GPS (differential global positioning system). The location detection chipset/component 34 may or may not be part of an in-vehicle navigation unit.

It is to be understood that the VCP 44 may also include a real-time clock (RTC), a short-range wireless antenna, and/or a multi-band or multi-mode antenna. The real-time clock (RTC) provides accurate date and time information to the VCP 44 hardware and software components that may require and/or request date and time information. The short-range wireless antenna may service the short-range wireless communication unit and the multi-band or multi-mode antenna may service the location detection chipset/component and the cellular chipset/component 70. The multi-band or multi-mode antenna may, however, handle a variety of services, such as cellular, location (e.g., GPS), radio, short range (e.g., WI-FI™). In other instances, separate antennas are used for each service, or separate antennas are used for certain combinations of services. It is to be understood that the VCP 44 may be implemented without one or more of the above listed components, or may include additional components and functionality as desired for a particular end use.

As illustrated in FIG. 1, the vehicle 16 may also include other vehicle systems that are connected to the vehicle bus system 48. Examples of these other vehicle systems may include any vehicle sensors 30 (e.g., key and key fob sensors, electronic system power sensors, hazard light sensors, etc.). The sensors 50 provide information and data points to the VCP 44 via the sensor interface module 46 (e.g. the powertrain control module, the climate control module, the body control module, and/or the like).

Figure 2:
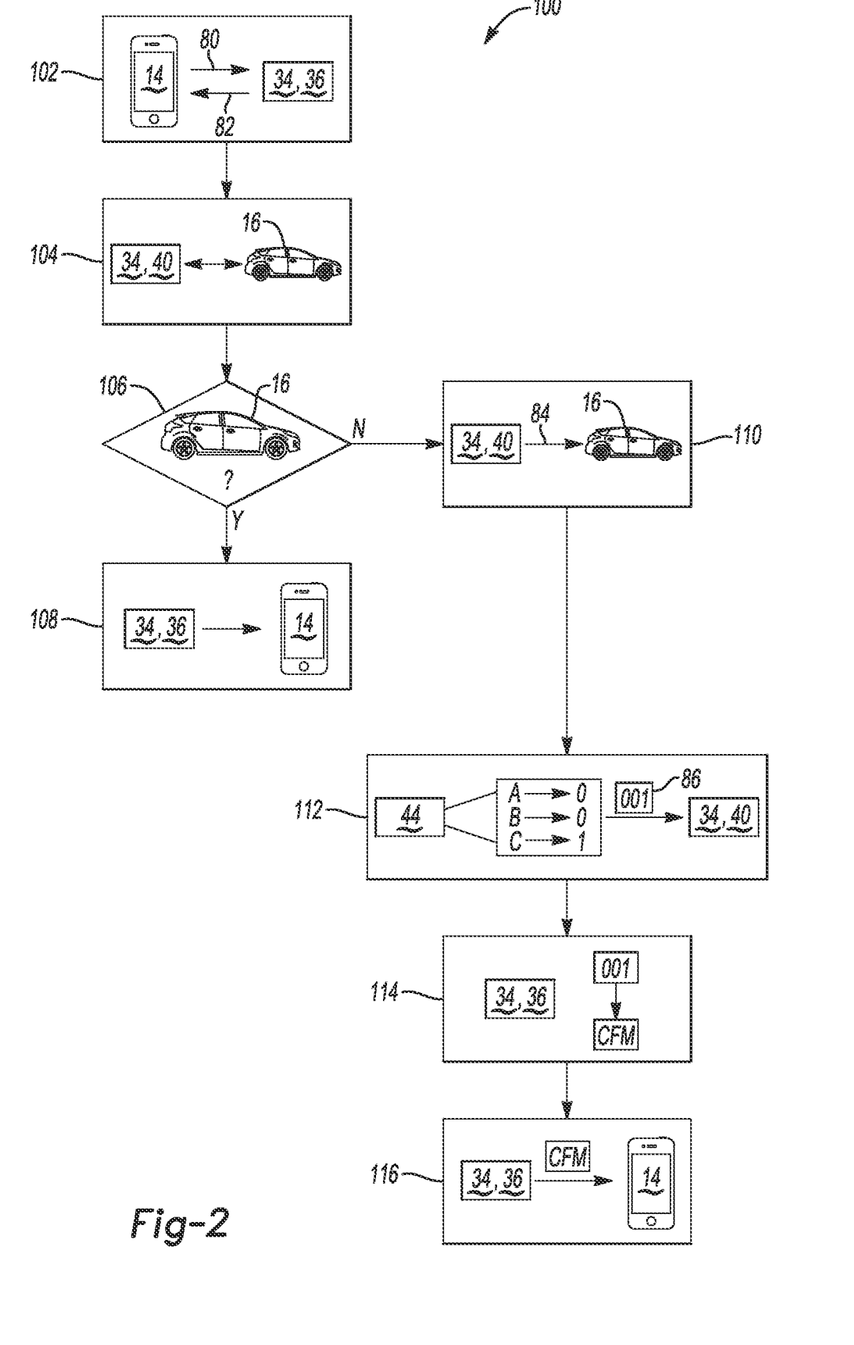
FIG. 2 is a schematic flow diagram illustrating an example of a method for messaging a mobile communications device about a vehicle remote start attempt.

FIG. 2 depicts an example of a method 100 for messaging the mobile communications device 14 about the vehicle remote start attempt. It is to be understood that components of the system 10 will be referenced throughout the discussion of the method 100.

As shown at box 102 of FIG. 2, a user sends remote start attempt request 80 using the mobile communications device 14 (through application 38). The remote start attempt request 80 is received by the MIG 36 of communications server 34, which responds with a notification 82 that the vehicle remote start attempt is being processed. The application 38 and mobile communications device 14 display the notification 82 for the mobile communications device user.

The MIG 36 facilitates the transmission of the remote start attempt request 80 to the VCS 40. The VCS 40 starts a packet session with the vehicle 16, and generates and sends a remote start request to the vehicle 16. This is shown at box 104 of FIG. 2.

The VCS 40 then either waits for the success or failure notification from the VCP 44 of the vehicle 16, or polls the VCP 44 for the status of the remote start attempt. This is represented by box 106 of FIG. 2. At the end of the preset time or in response to a poll, the success or failure notification is transmitted to the VCS 40.

If the success notification is received by VCS 40, the MIG 36 will generate a success message indicating that the vehicle 16 has been successfully started. This message is transmitted to the mobile communications device 14 (as shown at box 108), and may be displayed for the user.

As shown at box 110, if the failure notification is received by VCS 40, the VCS 40 will transmit an inquiry 84 as to the cause of the failure to the VCP 44. The VCP 44 will then obtain data points (e.g., A, B, C) and generate the dynamic error message 86, which includes a bit string that is encoded with the failure cause (box 112). The VCP 44 recognizes which of the data points (e.g., A, B, C) are the reason for the remote start failure, and will assign the binary code (0 or 1) appropriately, as shown in box 112. The bits are then organized in the bit string according to the predefined order (e.g., bit 1 indicates one failure reason, which is associated with data point A, bit 2 indicates a second failure reason, which associated with data point B, bit 3 indicates a third failure reason, which is associated with data point C). As noted above, the order of the bits in the bit string is based upon each particular bit having been predefined with a particular failure cause. Once generated, the dynamic error message 86 is transmitted to the VCS 40 (also shown in box 112).

The MIG 36 receives the dynamic error message 86 from the VCS 40, and decodes the dynamic error message 86 as described herein. The binary code assigned to each bit is decoded (e.g., bit 1=0=not the failure cause, bit 2=0=not the failure cause, and bit 3=1=the failure cause), and the failure cause associated with the flagged bit signal (e.g., bit 3 in this example) is identified through the look up table. MIG 36 will generate a custom failure message CFM indicating the cause of the remote start failure or providing a user with additional instructions for dealing with the remote start failure (box 114).

As shown at box 116, the custom failure message is transmitted to the mobile communications device 14, and may be displayed for the user.

It is to be understood that the ranges provided herein include the stated range and any value or sub-range within the stated range. For example, a range from about 5 seconds to about 7 seconds should be interpreted to include not only the explicitly recited limits of about 5 seconds to about 7 seconds, but also to include individual values, such as 5.5 seconds, 6 seconds, 6.9 seconds, etc., and sub-ranges, such as from about 5.75 seconds to about 6.5 seconds, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A messaging system for vehicle remote start attempts, comprising:
    a communications server including computer readable instructions embodied on a non-transitory, tangible computer readable medium of a processor of the communications server, the computer readable instructions executable by the processor to:

detect a remote start attempt of a vehicle that is initiated by a mobile communications device;

transmit a remote start request to the vehicle;

receive, from the vehicle, a notification corresponding to failure of the remote start attempt, wherein the notification indicates that the vehicle is not successfully started;

in response to the notification:
receive, from the vehicle, a cause of the failure encoded in a dynamic error message;
decode the dynamic error message; and
construct a custom failure message that is indicative of the cause of the remote start failure; and transmit the custom failure message to the mobile communications device.

2. The messaging system as defined in claim 1 wherein the computer readable instructions further include computer readable instructions executable by the processor of the communications server to transmit a notification message of the remote start attempt to the mobile communications device.

3. The messaging system as defined in claim 2, further comprising the mobile communications device, the mobile communications device including:
a display; and
computer readable instructions embodied on a non-transitory, tangible computer readable medium of a processor of the mobile communications device, the computer readable instructions executable by the processor of the mobile communications device to display the notification message of the remote start attempt on the display of the mobile communications device.

4. The messaging system as defined in claim 1 wherein the computer readable instructions further include computer readable instructions executable by the processor of the communications server to request the vehicle to transmit the cause of the failure upon receiving the notification corresponding to the failure of the remote start attempt.

5. The messaging system as defined in claim 1, further comprising a vehicle communications platform to:
transmit, to the communications server, the notification corresponding to the remote start attempt; and
transmit, to the communications server, the cause of the failure encoded in the dynamic error message.

6. The messaging system as defined in claim 1, further comprising the mobile communications device, including:
a display; and
computer readable instructions embodied on a non-transitory, tangible computer readable medium of a processor the mobile communications device, the computer readable instructions executable by the processor of the mobile communications device to display the custom failure message on the display of the mobile communications device.

7. The messaging system as defined in claim 1 wherein the cause of the failure is selected from the group consisting of a key fob is detected in the vehicle, a hazard event, a hood ajar event, a maximum crank time has been achieved, a key in ignition event, a voltage out of range event, no remaining starts available, no remaining start attempts available, vehicle engine stalled, vehicle valet mode active, remote vehicle start disabled, and combinations thereof.

8. A method for messaging a mobile communication device about a vehicle remote start attempt, the method comprising:
detecting the remote start attempt of a vehicle that is initiated by the mobile communications device;
transmitting a remote start request to the vehicle;
receiving, from the vehicle, a notification corresponding to failure of the remote start attempt, wherein the notification indicates that the vehicle is not successfully started;
in response to the notification:
receiving, from the vehicle, a cause of the failure encoded in a dynamic error message;
decoding the dynamic error message; and
constructing a custom failure message that is indicative of the cause of the remote start failure; and
transmitting the custom failure message to the mobile communications device.

9. The method as defined in claim 8, further comprising displaying the custom failure message on a display of the mobile communications device.

10. The method as defined in claim 8 wherein prior to the receiving of the notification corresponding to the failure of the remote start attempt, the method further comprises:
transmitting a notification message of the remote start attempt to the mobile communications device; and
displaying the notification message of the remote start attempt on a display of the mobile communications device.

11. The method as defined in claim 8 wherein prior to the receiving of the cause of the failure, the method further comprises transmitting an inquiry to the vehicle to obtain the cause of the failure.

12. The method as defined in claim 11 wherein in response to the inquiry, the method further comprises determining the cause of the failure by a vehicle communications platform of the vehicle.

13. The method as defined in claim 11 wherein the decoding of the dynamic error message reveals the cause of the failure by numerical signals, and wherein the method further comprises using a flagged numerical signal and a look up table to identify the cause of the failure.

14. The method as defined in claim 8 wherein prior to the receiving of the notification, the method further comprises delaying polling of the vehicle for the notification for at least 25 seconds after the transmitting of the remote start request.

15. The method as defined in claim 8 wherein a communications server including a processor executing computer readable instructions embodied on a non-transitory, tangible computer readable medium of the processor performs each of the steps.

* * * * *